C. A. WARD.
STEERING GEAR.
APPLICATION FILED MAR. 18, 1919.
1,341,349.
Patented May 25, 1920.
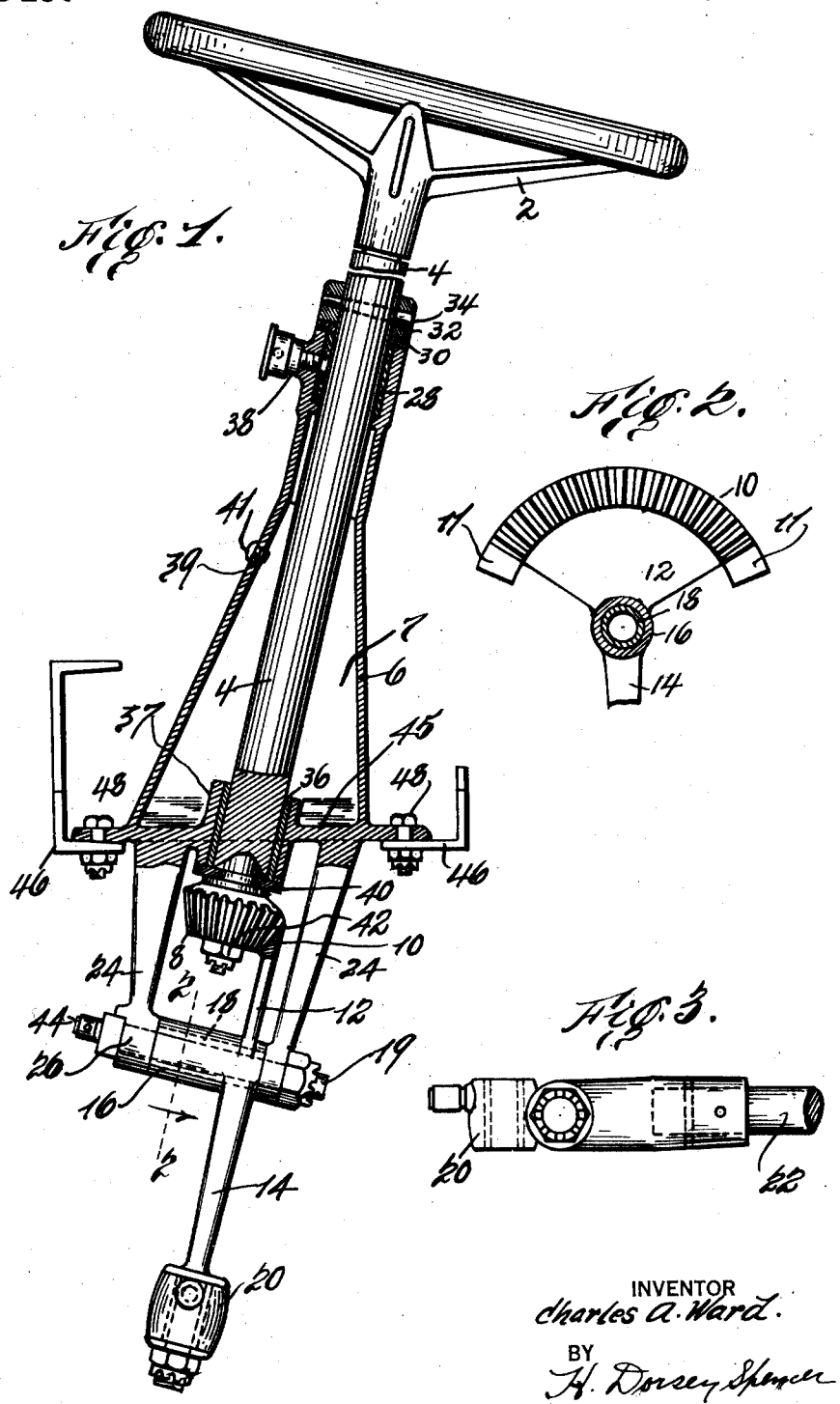
INVENTOR
Charles A. Ward.
BY
H. Dorsey Spencer
ATTORNEY

UNITED STATES PATENT OFFICE.

CHARLES A. WARD, OF MOUNT VERNON, NEW YORK.

STEERING-GEAR.

1,341,349.  Specification of Letters Patent.  Patented May 25, 1920.

Application filed March 18, 1919. Serial No. 283,309.

*To all whom it may concern:*

Be it known that I, CHARLES A. WARD, a citizen of the United States, residing at Mount Vernon, New York, have invented certain new and useful Improvements in Steering-Gears, of which the following is a clear, full, and exact description.

This invention relates to steering gear for vehicles, and particularly to steering columns and steering controls, and is herein shown as embodied in a steering control of the pinion and sector type. It will be understood, however, that the invention is not restricted to the illustrated embodiment, and that many features of the invention are of general applicability in the art to which the invention relates.

A general object of the invention is to provide an improved steering column construction in which the steering post will be effectively guided and supported, which will be simple and compact in construction, and which will require a minimum of attention to maintain the parts in effective working condition.

A particular object of the invention is to provide a steering column construction in which all parts of the steering control will be effectively lubricated.

Another object of the invention is to provide for the effective maintenance of the parts in their proper operative relations, and particularly to prevent the bearings or other parts from becoming misplaced with respect to each other. To this end an important feature of the invention is the provision of an integral bearing support for the steering post and for the sector gear or other means by which the rotary movement of the steering post is translated into proper steering movement of the steering wheels. Another important feature of the invention is the means for maintaining operative connections between the steering post and the sector gear.

Other objects and important features of the invention will appear from the following description and claims when considered in connection with the accompanying drawings in which Figure 1 is a view, partly in vertical section and partly in side elevation, of an embodiment of the invention.

Fig. 2 is a detail view showing the sector gear in front elevation; and

Fig. 3 is a detail view illustrating that end of the connecting rod which is connected to the sector gear.

As hereinabove suggested, an important feature of the invention is the provision of an integral support in which are carried both the bearings for the steering post 4, and also the bearings for the sector gear 10. By reason of the constant use and strain to which the steering control is subjected, it is very important that the bearings for the mechanism through which the movement of the steering hand wheel 2 is transmitted to the steering road wheels shall be maintained in constant operative condition, and that there shall be no danger that the bearings for the different movable parts of this mechanism, shall become misplaced with respect to each other, so that the parts will not properly coöperate.

In the illustrated construction, the supporting frame 6 of the steering column and the bracket arms 24, which carry the steering sector, are cast in one piece provided with a base part 45 having flanges outside the upright part 6 by which the steering column may be attached to parts of the vehicle frame, as for example to the cross beams 46 of the vehicle frame by any suitable means, such as the bolts 48.

The upright portion 6 of the steering column has within it a chamber 7, and has at its upper end a bearing for the steering post 4 provided with a bushing 28, and has at its lower end a similar bearing for the steering post 4 provided with a bushing 36. The steering post is confined against endwise movement in these bearings by means of a collar 32, pinned to said post by a pin 34, said collar 32 resting upon a washer 30 upon the upper end of the upper bearing in the upright 6 the lower end of said post having attached thereto a bevel pinion 8, keyed to said post to turn therewith, said pinion having interposed between it and the lower bearing of said post a washer 40, the pinion being preferably attached to a reduced lower end of said post, by any suitable means, as for example by a nut 42.

The bevel pinion 8 has not only a beveled toothed periphery meshing with the beveled gear sector 10, but preferably has also a beveled upper margin for a purpose hereinafter set forth. To prevent the bevel gear 8 and the sector 10 from moving out of operative engagement with each other, the sector 10 is preferably provided with a stop portion 11 at each end of its toothed face, these portions being formed in any suitable manner, as, for example, by leaving uncut at the ends the face from which the sector teeth have been cut.

The sector gear 10 has a hub 16, fitting between the bearing supports of the brackets 24, this hub surrounding a bushing 18 on a bolt or shaft 19 extending between the brackets 24 and confined in said brackets in any suitable manner. An arm 14, integral with and extending below the hub 16, is connected by a universal 20 to the steering rod 22.

As hereinabove suggested, one of the important features of the invention is the provision of means for insuring proper lubrication of the steering column. For the upper bearing of the steering post an oil cup 38 has been provided, this cup being preferably arranged upon the upper side of the inclination of this post, whereby the oil provided at this bearing serves not only to lubricate this bearing, but is carried down the post and serves also to effect lubrication of the lower bearing of the post, and not only does the oil carried down the post effect lubrication of the lower bearing, but some of this oil passes through this bearing and over the inclined upper margin of the bevel gear 8 and serves to lubricate the intermeshing teeth of these gears.

In order further to insure proper lubrication of the lower bearing of the post 4, and also the lubrication of the gear teeth, a supply of oil is preferably provided in the lower part of chamber 7 in the upright part 6 of the steering column, this oil being preferably maintained at substantially the level of the upper edge of the boss 37, which constitutes a part of the lower bearing, whereby, by capillary action and by the rocking of the vehicle, the oil is caused to work itself into and through this lower bearing. This oil may be introduced into the chamber 7 through an opening 39, adapted to be closed by a screw 41.

What I claim is:

1. In a steering apparatus for vehicles, the combination with the steering wheel post, of a beveled pinion connected to said post at one end thereof, a pivotally mounted sector gear engaging said pinion, an integral support, a bearing at the upper part thereof for said wheel post and a bearing at the lower part thereof for said sector gear.

2. In a steering apparatus for vehicles, the combination with the steering wheel post, of a beveled pinion connected to said post at one end thereof, a pivotally mounted sector gear engaging said pinion, and an integral support, said support having a bearing at the upper portion thereof and a bearing adjacent to said pinion, both said bearings supporting said post, and having a third bearing supporting said sector gear.

3. In a steering apparatus for vehicles, the combination with the steering wheel post, of a beveled pinion connected to said post at one end thereof, a pivotally mounted sector gear engaging said pinion, an integral support comprising a casing through which the steering wheel post passes and in which it has its bearings, and brackets depending from said support providing a bearing for said sector gear.

4. In a steering apparatus for vehicles, the combination with the steering wheel post, of a pinion at one end of said post, upper and lower bearings for said post, a gear in mesh with said pinion, connections from said gear to the steering rod and an oil opening communicating with said upper post bearing and an oil reservoir arranged about and adapted to supply said lower post bearing, said pinion being so constructed and so arranged with respect to said post bearings that oil passes for lubricating said parts from said bearing supply to said pinion and to said gear.

5. In a steering apparatus for vehicles, the combination with the steering post, a sector gear and a pinion on said post engaging said sector gear, of an integral support for said post and sector gear comprising a hollow casing carrying upper and lower bearings for said post and providing a reservoir for lubricant.

6. In steering apparatus for vehicles, the combination with the steering post, a sector operating pinion carried upon the lower end of said post, and a sector turning about an axis substantially normal to that of said post, of an integral support for said post and sector comprising a hollow casing having upper and lower post bearings, brackets depending from said casing upon opposite sides of said post and providing bearing supports for said sector gear, said casing providing also a reservoir for a lubricant for oiling the lower post bearing and the gear teeth.

Signed at Mount Vernon, N. Y., this 15th day of March, 1919.

CHARLES A. WARD.